(12) United States Patent
Qu et al.

(10) Patent No.: US 10,110,857 B2
(45) Date of Patent: Oct. 23, 2018

(54) INTELLIGENT MONITORING DEVICE AND METHOD

(71) Applicant: BEIJING SINONET SCIENCE & TECHNOLOGY CO., LTD., Beijing (CN)

(72) Inventors: Honggui Qu, Beijing (CN); Chao Zhou, Beijing (CN)

(73) Assignee: BEIJING SINONET SCIENCE & TECHNOLOGY CO., LTD., Beijing (CN)

( * ) Notice: Subject to any disclaimer, the term of this patent is extended or adjusted under 35 U.S.C. 154(b) by 47 days.

(21) Appl. No.: 15/312,302

(22) PCT Filed: Aug. 18, 2014

(86) PCT No.: PCT/CN2014/084599
§ 371 (c)(1),
(2) Date: Dec. 22, 2016

(87) PCT Pub. No.: WO2015/180267
PCT Pub. Date: Dec. 3, 2015

(65) Prior Publication Data
US 2017/0099464 A1    Apr. 6, 2017

(30) Foreign Application Priority Data
May 26, 2014    (CN) .......................... 2014 1 0223342

(51) Int. Cl.
*H04N 7/18*    (2006.01)
*H04N 5/33*    (2006.01)
(Continued)

(52) U.S. Cl.
CPC ............. *H04N 7/181* (2013.01); *G08B 21/14* (2013.01); *H04N 5/2351* (2013.01); *H04N 5/2354* (2013.01); *H04N 5/332* (2013.01)

(58) Field of Classification Search
USPC .......................... 348/152, 153, 159, 155, 154
See application file for complete search history.

(56) References Cited

U.S. PATENT DOCUMENTS 5,898,391 A * 4/1999 Jefferies ................ B60R 25/102
340/426.16
2003/0016290 A1    1/2003 Kwon
(Continued)

FOREIGN PATENT DOCUMENTS

CN    2932873 Y    8/2007
CN    101227600 A    7/2008
(Continued)

OTHER PUBLICATIONS

International Search Report and Written Opinion dated Feb. 4, 2015 for PCT application PCT/CN2014/084599 filed Aug. 18, 2014.
Search Report dated Oct. 13, 2017 for EP application 14893665.1.

*Primary Examiner* — Daquan Zhao

(57) ABSTRACT

An intelligent monitoring device and method is provided in this invention. In the intelligent monitoring device, a video capture unit collects video information using a camera in real time; an audio processing unit is collects audio information using a pickup in real time; an audio/video analysis unit performs a recognition analysis on the video information and the audio information collected in real time and sends an analysis result to a control unit; according to the analysis result sent from the audio/video analysis unit, if a monitored value that is greater than a corresponding threshold value exists in the video information or audio information collected in real time, the control unit triggers a speaker to issue an alarm through the audio processing unit. Through monitoring an on-site environment in real time from different perspectives, it is convenient to comprehensively monitor situations in public places to enable the security department to effectively take early measures to handle situations (Continued)

that endanger public safety and prevent the occurrence of major accidents.

18 Claims, 3 Drawing Sheets

(51) Int. Cl.
*H04N 5/235* (2006.01)
*G08B 21/14* (2006.01)
*H04N 5/30* (2006.01)

(56) References Cited

U.S. PATENT DOCUMENTS

| | | | |
|---|---|---|---|
| 2005/0242948 A1* | 11/2005 | Tarr | G08B 25/009 340/539.22 |
| 2006/0227237 A1* | 10/2006 | Kienzle | G08B 13/194 348/343 |
| 2008/0309761 A1 | 12/2008 | Kienzle et al. | |
| 2010/0225617 A1* | 9/2010 | Yoshimoto | G06F 3/042 345/175 |

FOREIGN PATENT DOCUMENTS

| | | |
|---|---|---|
| CN | 201515467 U | 6/2010 |
| CN | 102303608 A | 1/2012 |
| CN | 202587225 U | 12/2012 |
| CN | 203055114 U | 7/2013 |
| JP | 07-049713 A | 2/1995 |
| JP | 2000184362 A | 6/2000 |
| JP | 2002074559 A | 3/2002 |
| JP | 2013143655 A | 7/2013 |
| WO | 2011109935 A1 | 9/2011 |

* cited by examiner

Figures

INTELLIGENT MONITORING DEVICE AND METHOD

FIELD OF THE INVENTION

This invention relates to the field of monitoring, particularly to an intelligent monitoring device and method.

BACKGROUND ART

Currently, as required by the maintenance of social stability and preventing violent terrorist attacks, video monitoring has been widely applied at various public places. Generally, video monitoring is technical means substituting for human eyes monitoring to enable the security department to be aware of on-site situations remotely. Wherein, some front end cameras are integrated with intelligent feature recognition and behavior detection algorithms, and may analyze according to predetermined rules, to identify any person entering into a restricted zone, crossing warning lines, or gathered crows. Accordingly, an alarm may be issued to a monitoring center based on the analysis result to prompt the surveillant to pay attention to abnormal events.

However, at least following issues present in the prior art. Current video monitoring systems or intelligent monitoring cameras are only provided with video collection and analysis functions, but cannot found abnormal sounds or smells such as screams, oil or gad leakages, smoke pervasion, which however are constitutions of abnormal events and may diffuse and affect public safety if no early reactions are taken. Meanwhile, if an emergency occurs, persons at the scene cannot notify the security department in time through the video monitoring system.

SUMMARY OF INVENTION

An object of this invention is: to provide an intelligent monitoring device and method. Through monitoring an on-site environment in real time from different perspectives, it is convenient to comprehensively monitor situations in public places to enable the security department to effectively take early measures to handle situations that endanger public safety and prevent the occurrence of major accidents.

According to an aspect of the invention, an intelligent monitoring device is provided, comprising a video capture unit, a camera, an audio processing unit, a pickup, an audio/video analysis unit, a control unit, and a speaker, wherein:

the video capture unit is used to collect video information using a camera in real time;

the audio processing unit is used to collect audio information using the pickup in real time;

the audio/video analysis unit is used to perform a recognition analysis on the video information and the audio information collected in real time and send an analysis result to the control unit;

the control unit is used to, according to the analysis result sent from the audio/video analysis unit, if a monitored value that is greater than a corresponding threshold value exists in the video information or audio information collected in real time, trigger the speaker to issue an alarm through the audio processing unit.

In an embodiment, the device further comprises a smell sensor and a smell analysis unit, wherein:

the smell analysis unit is used to perform a detection analysis on smell information collected by the smell sensor in real time and send its analysis result to the control unit;

the control unit is further used to, according to the analysis result of the smell analysis unit, if a concentration of a smoke or organic volatile gas is greater than a corresponding concentration threshold value, trigger the speaker to issue an alarm through the audio processing unit.

In an embodiment, the device further comprises a communication unit, wherein:

the control unit is further used to send report information to the communication unit, wherein the report information comprises video information and audio information collected in real time, and the analysis result received by the control unit;

the communication unit is used to send the report information sent from the control unit to the monitoring center.

In an embodiment, the device further comprises a positioning unit, wherein:

the positioning unit is used to send current positioning information to the control unit at a predetermined time interval;

the report information further comprises the current positioning information provided by the positioning unit.

In an embodiment, the control unit is further used to trigger the speaker to issue an alarm through the audio processing unit when remote alarm information sent from the monitoring center is received through the communication unit.

In an embodiment, the control unit is further used to trigger the speaker to broadcast through the audio processing unit when voice information sent from the monitoring center is received through the communication unit.

In an embodiment, the device further comprises an alarming button, wherein:

the alarming button is used to send alarm triggering information to the control unit as a trigger event;

the control unit is further used to trigger the speaker to issue an alarm through the audio processing unit when the alarm triggering information is detected.

In an embodiment, the device further comprises a warning light, wherein:

the control unit particularly triggers the warning light to flash when the speaker is triggered to issue an alarm through the audio processing unit.

In an embodiment, the device further comprises a storage unit, wherein:

storing, by the control unit, video information collected by the video capture unit in real time in the storage unit during a period in which the speaker is triggered to issue an alarm through the audio processing unit.

In an embodiment, the camera comprises a first camera and a second camera with night vision function, wherein the control unit triggers the video capture unit to collect video information via the first camera when the device is activated, wherein:

the audio/video analysis unit particularly determines according to the video information whether a current environment light intensity is greater than a predetermined light intensity threshold value;

the control unit is further used to, according to an analysis result sent from the audio/video analysis unit, if the current environment light intensity is greater than the predetermined light intensity threshold value, trigger the video capture unit to collect video information via the first camera; if the current environment light intensity is not greater than the predetermined light intensity threshold value, trigger the video capture unit to collect video information via the second camera;

In an embodiment, the device further comprises an infrared light supplement lamp, wherein the control unit triggers to turn off the infrared light supplement lamp when the device is activated, wherein:

the audio/video analysis unit particularly determines according to the video information whether the current environment light intensity is greater than the predetermined light intensity threshold value;

the control unit is further used to, according to the analysis result sent from the audio/video analysis unit, if the current environment light intensity is greater than the predetermined light intensity threshold value, trigger to turn off the infrared light supplement lamp; if the current environment light intensity is not greater than the predetermined light intensity threshold value, trigger to turn on the infrared light supplement lamp to supplement light for the camera.

According to another aspect of this invention, an intelligent monitoring method is provided, comprising:

collecting, by a video capture unit, video information using a camera in real time;

collecting, by an audio processing unit, audio information using a pickup in real time;

performing, by an audio/video analysis unit, a recognition analysis on the video information and the audio information collected in real time and sending an analysis result to a control unit;

according to the analysis result sent from the audio/video analysis unit, if a monitored value that is greater than a corresponding threshold value exists in the video information or audio information collected in real time, triggering, by the control unit, a speaker to issue an alarm through an audio processing unit.

In an embodiment, a smell analysis unit is used to perform a detection analysis on smell information collected by a smell sensor in real time and send its analysis result to the control unit;

according to the analysis result of the smell analysis unit, if a concentration of a smoke or organic volatile gas is greater than a corresponding concentration threshold value, the control unit triggers the speaker to issue an alarm through the audio processing unit.

In an embodiment, the control unit sends report information to the communication unit, wherein the report information comprises video information and audio information collected in real time, and the analysis result received by the control unit.

In an embodiment, the report information further comprises current positioning information provided by the positioning unit.

In an embodiment, the control unit is further used to trigger the speaker to issue an alarm through the audio processing unit when remote alarm information sent from the monitoring center is received through a communication unit.

In an embodiment, the control unit triggers the speaker to broadcast through the audio processing unit when voice information sent from the monitoring center is received through the communication unit.

In an embodiment, the control unit triggers the speaker to issue an alarm through the audio processing unit when it is detected that an alarming button is triggered.

In an embodiment, the control unit triggers a warning light to flash when the speaker is triggered to issue an alarm through the audio processing unit.

In an embodiment, the control unit stores video information collected by the video capture unit in real time in a storage unit during a period in which the speaker is triggered to issue an alarm through the audio processing unit.

In an embodiment, the camera comprises a first camera and a second camera with night vision function, wherein the control unit triggers the video capture unit to collect video information via the first camera when the device is activated, wherein:

the recognition analysis further comprises determining whether a current environment light intensity is greater than a predetermined light intensity threshold value;

according to the analysis result sent from the audio/video analysis unit, if the current environment light intensity is greater than the predetermined light intensity threshold value, the control unit further triggers the video capture unit to collect video information via the first camera;

if the current environment light intensity is not greater than the predetermined light intensity threshold value, trigger the video capture unit to collect video information via the second camera.

In an embodiment, the recognition analysis further comprises determining whether a current environment light intensity is greater than a predetermined light intensity threshold value;

according to an analysis result sent from the audio/video analysis unit, if the current environment light intensity is greater than the predetermined light intensity threshold value, the control unit further triggers to turn off an infrared light supplement lamp;

if the current environment light intensity is not greater than the predetermined light intensity threshold value, triggers to turn on the infrared light supplement lamp to supplement light for the camera;

wherein the control unit triggers to turn off the infrared light supplement lamp when the device is activated.

According to this invention, through monitoring an on-site environment in real time from different perspectives, it is convenient to comprehensively monitor situations in public places to enable the security department to effectively take early measures to handle situations that endanger public safety and prevent the occurrence of major accidents.

DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention, but are not limitation thereof. In the drawings.

DETAILED DESCRIPTION OF THE PREFERRED EMBODIMENT

Below, the technical solution of this invention will be further described in detail with reference to the accompanying drawings and embodiments.

Figure 1:
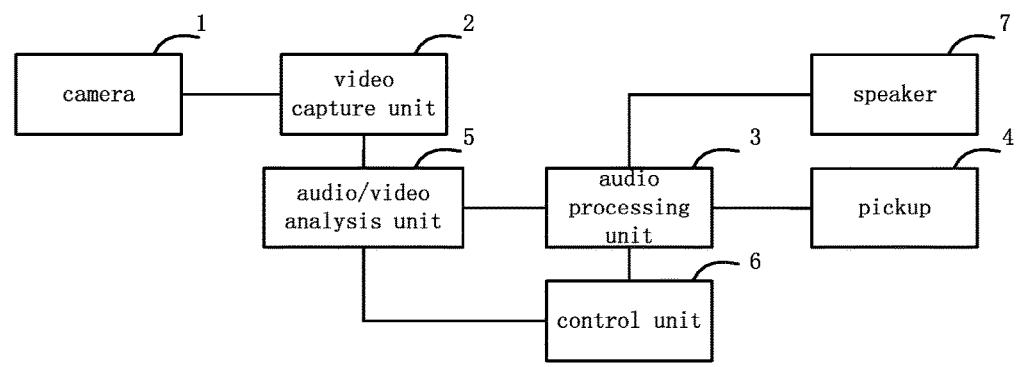
FIG. 1 is a schematic view of an embodiment of the intelligent monitoring device of this invention.

FIG. 1 is a schematic view of an embodiment of the intelligent monitoring method of this invention. As shown in FIG. 1, the intelligent monitoring device comprises a camera 1, a video capture unit 2, an audio processing unit 3, a pickup 4, an audio/video analysis unit 5, a control unit 6, and a speaker 7. Wherein:

the video capture unit 2 is used to collect video information using a camera 1 in real time.

Preferably, the video capture unit 2 may be a CMOS (Complementary Metal-Oxide Semiconductor) or CCD (Charge Coupled Device) image sensor. The video capture unit 2 may send video data collected in real time in the RAW format to the audio/video analysis unit 5 through a MIP (Mobile Industry Processor Interface) interface.

The audio processing unit 3 is used to collect audio information using a pickup 4 in real time.

Preferably, the audio processing unit 3 may be an audio codec. For example, it may be implemented with an audio chip having a LINE IN audio sampling interface (to a pickup) and a SPEAK OUT audio output interface (to a speaker), to send ADPCM (Adaptive Differential Pulse Code Modulation) audio data to the audio/video analysis unit 5.

The audio/video analysis unit 5 is used to perform a recognition analysis on the video information and the audio information collected in real time and to send its analysis result to the control unit 6.

Preferably, the audio/video analysis unit 5 may be implemented with a DSP (Digital Signal Processor) to recognize video features, behaviors, audio decibel levels and contents according to particular algorithms.

Because those skilled in the art are aware of the particular implementation methods for recognition, no detailed description will be given herein.

The control unit 6 is used to, according to the analysis result sent from the audio/video analysis unit 5, if a monitored value that is greater than a corresponding threshold value exists in the video information or audio information collected in real time, trigger the speaker 7 to issue an alarm through the audio processing unit 3.

Based on the intelligent monitoring device provided in the greater than embodiment of this invention, through monitoring an on-site environment in real time from different perspectives, it is convenient to comprehensively monitor situations in public places to enable the security department to effectively take early measures to handle situations that endanger public safety and prevent the occurrence of major accidents.

Figure 2:
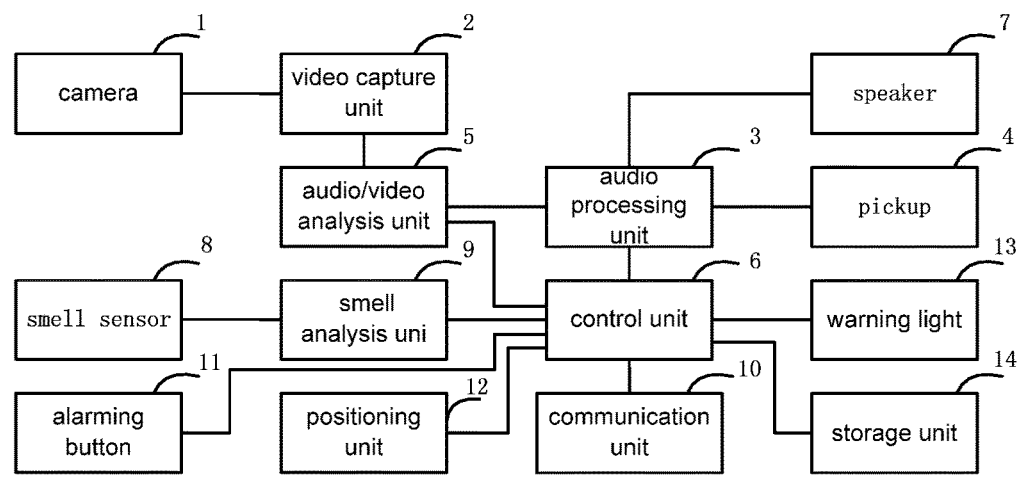
FIG. 2 is a schematic view of another embodiment of the intelligent monitoring device of this invention.

FIG. 2 is a schematic view of another embodiment of the intelligent monitoring device of this invention. Compared with the embodiment shown in FIG. 1, the embodiment shown in FIG. 2 further comprises a smell sensor 8 and a smell analysis unit 9, wherein:

the smell analysis unit 9 is used to perform a detection analysis on smell information collected by the smell sensor 8 in real time and send its analysis result to the control unit 6.

The control unit 6 is further used to, according to the analysis result of the smell analysis unit 9, if a concentration of a smoke or organic volatile gas is greater than a corresponding concentration threshold value, trigger the speaker to issue an alarm through the audio processing unit.

Preferably, the smell sensor 8 may be an indirectly heated semiconductor gas-sensitive element, formed by coating a nano-scale semiconductor material SnO2 on a ceramic heater and doping an appropriate amount of trace elements, which is sensitive to smokes or organic volatile gases such as alcohol, ammonia, hydrogen, carbon monoxide, methane, propane, styrene, propylene glycol, phenol, methylbenzene, ethylbenzene, dimethylbenzene, formaldehyde, that are generated by the burning of cigarettes, woods, papers or the like. The smell analysis unit 9 is connected to the control unit 6 through a RS232 interface.

Through performing a smell detection and analysis, situations in public places may be monitored in a further comprehensive manner.

In an embodiment, as shown in FIG. 2, the intelligent monitoring device further comprises a communication unit 10. Wherein:

the control unit 6 is further used to send report information to the communication unit 10, wherein the report information comprises video information and audio information collected in real time, and an analysis result received by the control unit.

The communication unit 10 is used to send the report information sent from the control unit 6 to the monitoring center. Transmission may be made over 3G, 4G, WiFi or Ethernet networks.

Thus, the monitoring center may be aware of a variety of current information timely through the network.

In an embodiment, as shown in FIG. 2, the intelligent monitoring device further comprises a positioning unit 12. Wherein:

the positioning unit 12 is used to send current positioning information to the control unit 6 at a predetermined time interval. The report information further comprises the current positioning information provided by the positioning unit. Thereby, the monitoring center may rapidly get to know the current position of the intelligent monitoring device.

The positioning unit 12 may perform its positioning operation using the GPS (Global Positioning System), Beidou or other positioning systems.

In an embodiment, as shown in FIG. 2, the intelligent monitoring device further comprises an alarming button 11, wherein:

the alarming button 11 is used to send alarm triggering information to the control unit 6 as a trigger event.

The control unit 6 is further used to trigger the speaker 7 to issue an alarm through the audio processing unit 3 when the alarm triggering information is detected.

Thus, an alarm may be issued manually.

Preferably, the control unit 6 is further used to trigger the speaker 7 to issue an alarm through the audio processing unit 3 when remote alarm information sent from the monitoring center is received through the communication unit 10.

Thus, the monitoring center may perform remote alarming control.

Preferably, the control unit 6 is further used to trigger the speaker 7 to broadcast through the audio processing unit 3 when voice information sent from the monitoring center is received through the communication unit 10. Thus, remote shouting may be realized.

In an embodiment, as shown in FIG. 2, the intelligent monitoring device further comprises a warning light. Wherein:

the control unit 6 particularly triggers the warning light 3 to flash when the speaker 7 is triggered to issue an alarm through the audio processing unit 3. Thus, audio and visual alarms may be issued respectively.

In an embodiment, as shown in FIG. 2, the intelligent monitoring device further comprises a storage unit 14. Wherein:

the control unit 6 stores video information collected by the video capture unit 2 in real time in the storage unit 14 during a period in which the speaker 7 is triggered to issue an alarm through the audio processing unit 3. Thus, relative video information during the alarming period may be stored.

Preferably, the storage unit 14 may be non-volatile memory.

Figure 3:
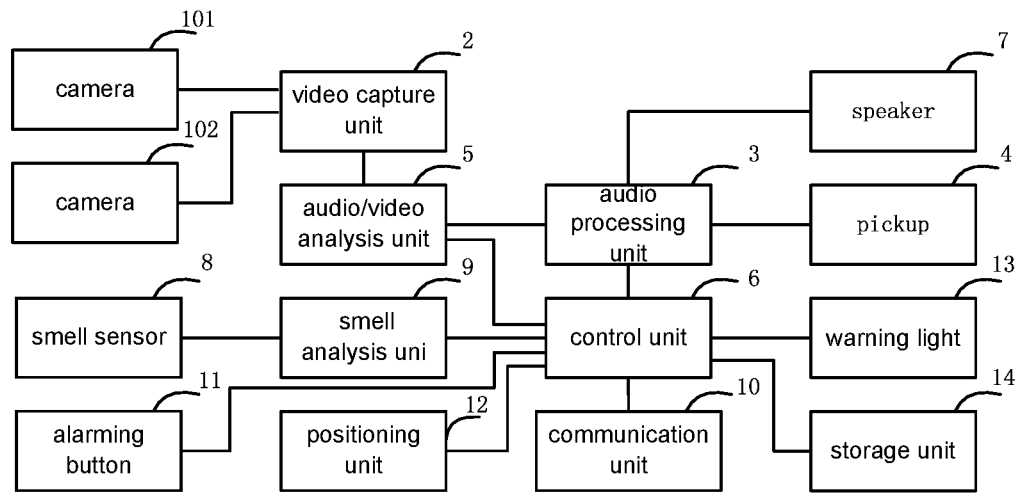
FIG. 3 is a schematic view of still another embodiment of the intelligent monitoring device of this invention.

FIG. 3 is a schematic view of still another embodiment of the intelligent monitoring device of this invention. Compared with the embodiment shown in FIG. 2, in the embodiment shown in FIG. 3, there are two cameras, a first camera 101 and a second camera 102, wherein the first camera 101 is activated when the environment light is stronger, and the second camera 102 with night vision function is activated when the environment light is darker.

Preferably, the control unit 6 triggers the video capture unit to collect video information via the first camera 101 when the device is activated. Then, dynamic adjustment may be performed according to environment light conditions. Wherein:

the audio/video analysis unit 5 particularly determines according to the video information whether a current environment light intensity is greater than a predetermined light intensity threshold value.

the control unit 6 is further used to, according to an analysis result sent from the audio/video analysis unit 5, if the current environment light intensity is greater than the predetermined light intensity threshold value, trigger the video capture unit 2 to collect video information via the first camera 101; if the current environment light intensity is not greater than the predetermined light intensity threshold value, trigger the video capture unit 2 to collect video information via the second camera 102.

Figure 4:
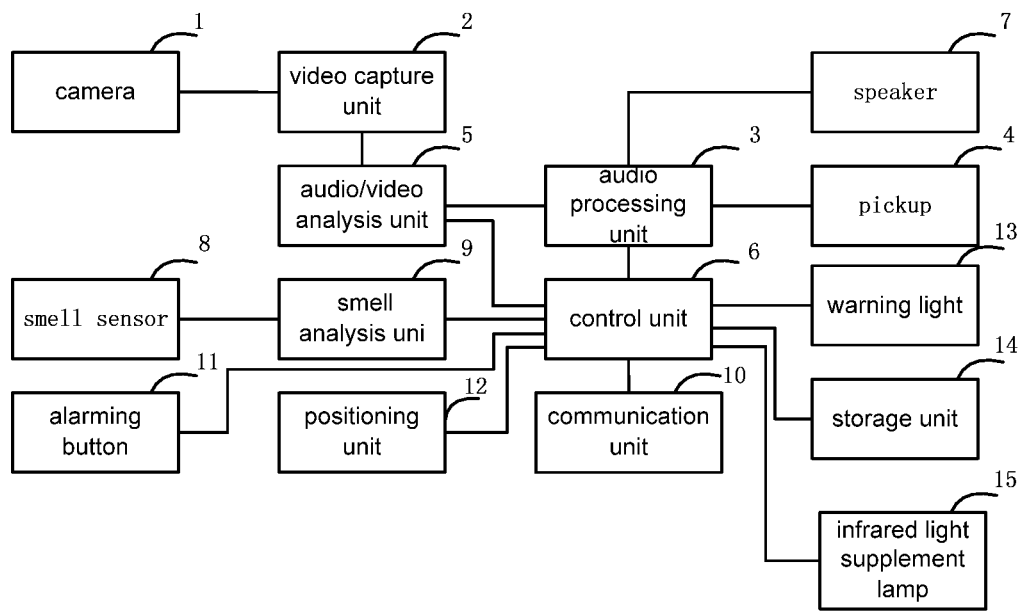
FIG. 4 is a schematic view of still another embodiment of the intelligent monitoring device of this invention.

FIG. 4 is a schematic view of still another embodiment of the intelligent monitoring device of this invention. Compared with the embodiment shown in FIG. 3, in the embodiment shown in FIG. 4, in addition to a camera 1, an infrared light supplement lamp 15 is provided, which is activated when the environment light is darker to supplement light for the camera 1.

Preferably, the control unit 6 triggers to turn off the infrared light supplement lamp 15 when the device is activated. Thereafter, dynamic adjustment may be performed according to environment light conditions. Wherein:

the audio/video analysis unit 5 particularly determines according to the video information whether a current environment light intensity is greater than a predetermined light intensity threshold value.

The control unit 6 is further used to, according to an analysis result sent from the audio/video analysis unit 5, if the current environment light intensity is greater than the predetermined light intensity threshold value, trigger to turn off the infrared light supplement lamp 15; if the current environment light intensity is not greater than the predetermined light intensity threshold value, trigger to turn on the infrared light supplement lamp 15 to supplement light for the camera 1.

Figure 5:
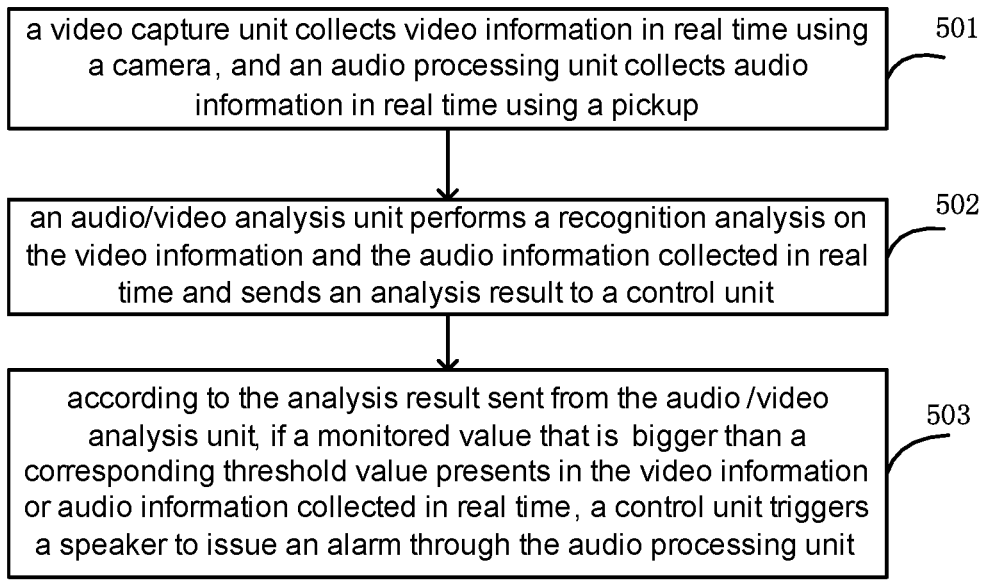
FIG. 5 is a schematic view of an embodiment of the intelligent monitoring method of this invention.

FIG. 5 is a schematic view of an embodiment of the intelligent monitoring method of this invention. Preferably, the steps of this embodiment may be carried out by an intelligent monitoring device.

At step 501, a video capture unit collects video information in real time using a camera, and an audio processing unit collects audio information in real time using a pickup.

The video capture unit and the audio processing unit provide the information collected in real time to an audio/video analysis unit respectively.

At step 502, the audio/video analysis unit performs a recognition analysis on the video information and the audio information collected in real time and sends an analysis result to a control unit.

At step 503, according to the analysis result sent from the audio/video analysis unit, if a monitored value that is greater than a corresponding threshold value exists in the video information or audio information collected in real time, the control unit triggers a speaker to issue an alarm through the audio processing unit.

Based on the intelligent monitoring method provided in the greater than embodiment of this invention, through monitoring an on-site environment in real time from different perspectives, it is convenient to comprehensively monitor situations in public places to enable the security department to effectively take early measures to handle situations that endanger public safety and prevent the occurrence of major accidents.

Preferably, the intelligent monitoring device further comprises a smell analysis unit and a smell sensor, wherein:

the smell analysis unit is used to perform a detection analysis on smell information collected by the smell sensor in real time and send its analysis result to the control unit. According to the analysis result of the smell analysis unit, if a concentration of a smoke or organic volatile gas is greater than a corresponding concentration threshold value, the control unit triggers the speaker to issue an alarm through the audio processing unit.

In an embodiment, the control unit sends report information to monitoring center through a communication unit, wherein the report information comprises video information and audio information collected in real time, and the analysis result received by the control unit. Thus, the monitoring center may be aware of a variety of current information timely through the network.

Preferably, the report information further comprises current positioning information provided by a positioning unit. Thereby, the monitoring center may rapidly get to know the current position of the intelligent monitoring device.

In an embodiment, the control unit triggers the speaker to issue an alarm through the audio processing unit when remote alarm information sent from the monitoring center is received through the communication unit. Thus, the monitoring center may perform remote alarming control.

Preferably, the control unit triggers the speaker to broadcast through the audio processing unit when voice information sent from the monitoring center is received through the communication unit. Thus, remote shouting may be realized.

In an embodiment, the control unit triggers the speaker to issue an alarm through the audio processing unit when it is detected that an alarming button is triggered. Thus, an alarm may be issued manually.

In an embodiment, the control unit triggers a warning light to flash when the speaker is triggered to issue an alarm through the audio processing unit. Thus, a visual alarm may be further provided.

In an embodiment, the control unit stores video information collected by the video capture unit in real time in a storage unit during a period in which the speaker is triggered to issue an alarm through the audio processing unit. Thus, relative video information collected during the alarming period may be stored.

In an embodiment, there are two cameras provided for the video capture unit, wherein a first camera is activated when the environment light is stronger and a second camera with night vision function is activated when the environment light is darker. For example, the control unit may trigger the video capture unit to collect video information via the first camera when the device is activated. Switching management between the first camera and the second camera may comprise:

performing a recognition analysis by the audio/video analysis unit on the video information and the audio information collected in real time further comprises, according to the video information, determining whether a current environment light intensity is greater than a predetermined light intensity threshold value. According to an analysis result sent from the audio/video analysis unit, if the current environment light intensity is greater than the predetermined light intensity threshold value, the control unit further triggers the video capture unit to collect video information via the first camera; if the current environment light intensity is not greater than the predetermined light intensity threshold value, triggers the video capture unit to collect video information via the second camera.

In another embodiment, only one camera is mounted on the video capture unit, and an infrared light supplement lamp is further equipped for the intelligent monitoring device. For example, the control unit may trigger to turn off the infrared light supplement lamp when the device is activated. Switching management of the infrared light supplement lamp may comprise the following steps:

performing a recognition analysis by the audio/video analysis unit on the video information and the audio information collected in real time further comprises, according to the video information, determining whether a current environment light intensity is greater than a predetermined light intensity threshold value. According to an analysis result sent from the audio/video analysis unit, if the current environment light intensity is greater than the predetermined light intensity threshold value, the control unit further triggers to turn off the infrared light supplement lamp; if the current environment light intensity is not greater than the predetermined light intensity threshold value, triggers to turn on the infrared light supplement lamp to supplement light for the camera.

Figure 6:
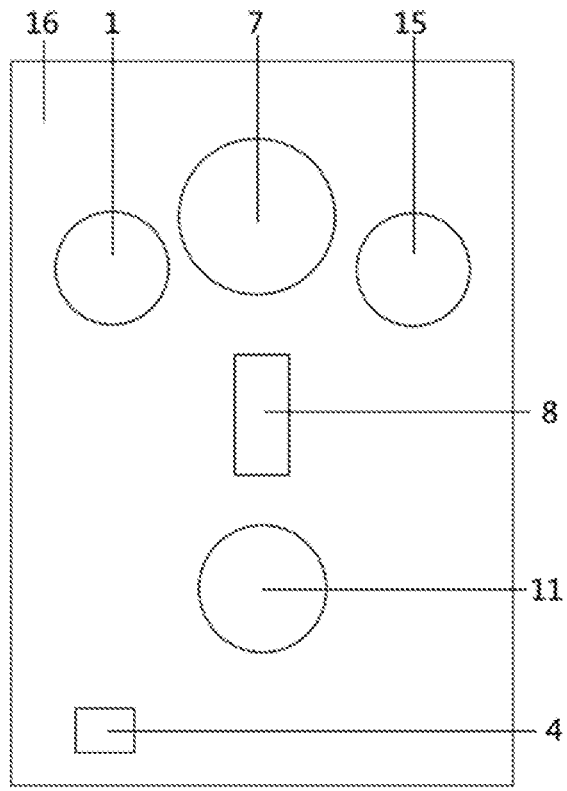
FIG. 6 is a schematic view of still another embodiment of the intelligent monitoring device of this invention.

FIG. 6 is a schematic view of still another embodiment of the intelligent monitoring device of this invention. As shown in FIG. 6, the intelligent monitoring device comprises a housing 16, a camera 1, a speaker 7, a camera (or an infrared light supplement lamp) 15, a smell sensor 8, a pickup 4 and an alarming button 11. Both of the camera 1 and the camera (or infrared light supplement lamp) 15 are used for video collection. The difference is that the camera 1 is activated when the environment light is stronger and the camera 15 is activated when the environment light is darker. In the case of a configuration having an infrared light supplement lamp, the camera 1 is always activated. The infrared light supplement lamp 15 is activated when the light is darker to supplement light for the camera 2. The speaker 7 is used to issue an alarm or prompt sound. The smell sensor 8 is used to detect abnormal smells. It should be noticed that the smell sensor 8 may comprise sensors of different types to facilitate the detection of different types of smells.

The pickup 4 is used for sound collection. The alarming button 11 is used to trigger an alarm manually.

With this invention, real-time monitoring of an on-site environment may be realized through simulating human perception, so that early warning may be issued, and a problem of existed intelligent monitoring cameras of unable to satisfying the demands for sound monitoring and smell monitoring simultaneously may be solved. Meanwhile, the device is provided with an alarming button. When an emergency occurs, a person who is on site may press down the alarming button to give an alert to the monitoring center to respond and resolve the event rapidly.

The above description of this invention is given for illustration and description, but is not exhaustive and is not intended to limit the present invention to the form disclosed herein. Various modifications and variations are obvious for a person of ordinary skill in the art. Embodiments are selected and described for a better illustration of the principle and practical application of this invention, so that those skilled in the art can understand this invention and envisage various embodiments with various modifications suited to specific usages.

What is claimed is:

1. An intelligent monitoring device, comprising a video capture unit, a camera, an audio processing unit, a pickup, an audio/video analysis unit, a control unit, a speaker, a smell sensor and a smell analysis unit, wherein:

the video capture unit is used to collect video information using a camera in real time;

the audio processing unit is used to collect audio information using the pickup in real time;

the audio/video analysis unit is used to perform a recognition analysis on the video information and the audio information collected in real time and send an analysis result to the control unit;

the smell analysis unit is used to perform a detection analysis on smell information collected by the smell sensor in real time and send an analysis result to the control unit; and wherein the control unit is used to, according to the analysis result sent from the audio/video analysis unit, if a monitored value that is greater than a corresponding threshold value exists in the video information or audio information collected in real time, trigger the speaker to issue an alarm through the audio processing unit;

the control unit is further used to, according to the analysis result of the smell analysis unit, if a concentration of a smoke or organic volatile gas is greater than a corresponding concentration threshold value, trigger the speaker to issue an alarm through the audio processing unit;

wherein the camera comprises a first camera and a second camera with night vision function, wherein the control unit triggers the video capture unit to collect video information via the first camera when the device is activated, wherein:

the audio/video analysis unit determines, according to the video information, whether a current environment light intensity is greater than a predetermined light intensity threshold value; and the control unit is further used to, according to the analysis result sent from the audio/video analysis unit, if the current environment light intensity is greater than the predetermined light intensity threshold value, trigger the video capture unit to collect video information via the first camera; if the current environment light intensity is not greater than the predetermined light intensity threshold value, trigger the video capture unit to collect video information via the second camera.

2. The device according to claim 1, further comprising a communication unit, wherein:

the control unit is further used to send report information to the communication unit, wherein the report information comprises the video information and the audio information collected in real time, and the analysis result received by the control unit; and the communication unit is used to send the report information sent from the control unit to a monitoring center.

3. The device according to claim 2, further comprising a positioning unit, wherein:
the positioning unit is used to send current positioning information to the control unit at a predetermined time interval; and
the report information further comprises the current positioning information provided by the positioning unit.

4. The device according to claim 2, wherein,
the control unit is further used to trigger the speaker to issue an alarm through the audio processing unit when remote alarm information sent from the monitoring center is received through the communication unit.

5. The device according to claim 2, wherein,
the control unit is further used to trigger the speaker to broadcast through the audio processing unit when voice information sent from the monitoring center is received through the communication unit.

6. The device according to claim 1, further comprising an alarming button, wherein:
the alarming button is used to send alarm triggering information to the control unit as a trigger event; and
the control unit is further used to trigger the speaker to issue an alarm through the audio processing unit when the alarm triggering information is detected.

7. The device according to claim 1, further comprising a warning light, wherein:
the control unit triggers the warning light to flash when the speaker is triggered to issue an alarm through the audio processing unit.

8. The device according to claim 1, further comprising a storage unit, wherein:
the control unit stores video information collected by the video capture unit in real time in the storage unit during a period in which the speaker is triggered to issue an alarm through the audio processing unit.

9. The device according to claim 1, further comprising an infrared light supplement lamp, wherein the control unit trigger to turn off the infrared light supplement lamp when the device is activated, wherein:
the audio/video analysis unit determines, according to the video information, whether a current environment light intensity is greater than a predetermined light intensity threshold value; and
the control unit is further used to, according to the analysis result sent from the audio/video analysis unit, if the current environment light intensity is greater than the predetermined light intensity threshold value, trigger to turn off the infrared light supplement lamp; if the current environment light intensity is not greater than the predetermined light intensity threshold value, trigger to turn on the infrared light supplement lamp to supplement light for the camera.

10. An intelligent monitoring method, comprising:
collecting, by a video capture unit, video information using a camera in real time;
collecting, by an audio processing unit, audio information using a pickup in real time;
performing, by an audio/video analysis unit, a recognition analysis on the video information and the audio information collected in real time and sending an analysis result to a control unit; and
according to the analysis result sent from the audio/video analysis unit, if a monitored value that is greater than a corresponding threshold value exists in the video information or audio information collected in real time, triggering, by the control unit, a speaker to issue an alarm through the audio processing unit;
wherein the method further comprises:
performing, by a smell analysis unit, a detection analysis on smell information collected by a smell sensor in real time and send an analysis result to the control unit; and
according to the analysis result of the smell analysis unit, if a concentration of a smoke or organic volatile gas is greater than a corresponding concentration threshold value, triggering, by the control unit, the speaker to issue an alarm through the audio processing unit;
wherein the camera comprises a first camera and a second camera with night vision function, wherein the control unit triggers the video capture unit to collect video information via the first camera when the device is activated, wherein:
the recognition analysis further comprises, according to the video information, determining whether a current environment light intensity is greater than a predetermined light intensity threshold value;
according to the analysis result sent from the audio/video analysis unit, if the current environment light intensity is greater than the predetermined light intensity threshold value, the control unit further triggers the video capture unit to collect video information via the first camera; and
if the current environment light intensity is not greater than the predetermined light intensity threshold value, triggers the video capture unit to collect video information via the second camera.

11. The method according to claim 10, further comprising:
sending, by the control unit, report information to a monitoring center through a communication unit, wherein the report information comprises the video information and the audio information collected in real time, and the analysis result received by the control unit.

12. The method according to claim 11, wherein
the report information further comprises current positioning information provided by a positioning unit.

13. The method according to claim 10, further comprising:
triggering, by the control unit, the speaker to issue an alarm through the audio processing unit when remote alarm information sent from the monitoring center is received through the communication unit.

14. The method according to claim 10, further comprising:
triggering, by the control unit, the speaker to broadcast through the audio processing unit when voice information sent from the monitoring center is received through the communication unit.

15. The method according to claim 10, further comprising:
triggering, by the control unit, the speaker to issue an alarm through the audio processing unit when it is detected that an alarming button is triggered.

16. The method according to claim 10, further comprising:
triggering, by the control unit, a warning light to flash when the speaker is triggered to issue an alarm through the audio processing unit.

17. The method according to claim 10, further comprising storing, by the control unit, the video information collected by the video capture unit in real time in a storage unit during a period in which the speaker is triggered to issue an alarm through the audio processing unit.

18. The method according to claim 10, wherein the recognition analysis further comprises, according to the video information, determining whether a current environment light intensity is greater than a predetermined light intensity threshold value;

according to the analysis result sent from the audio/video analysis unit, if the current environment light intensity is greater than the predetermined light intensity threshold value, the control unit further triggers to turn off an infrared light supplement lamp; and if the current environment light intensity is not greater than the predetermined light intensity threshold value, triggers to turn on the infrared light supplement lamp to supplement light for the camera;

wherein the control unit triggers to turn off the infrared light supplement lamp when the device is activated.

* * * * *